(12) United States Patent
Gray

(10) Patent No.: US 6,461,167 B1
(45) Date of Patent: Oct. 8, 2002

(54) RUNFLAT DISPLAY

(75) Inventor: Robert Lee Gray, Silver Lake, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/674,571

(22) PCT Filed: Jun. 3, 1998

(86) PCT No.: PCT/US98/11150

§ 371 (c)(1),
(2), (4) Date: Oct. 30, 2000

(87) PCT Pub. No.: WO99/63504

PCT Pub. Date: Dec. 9, 1999

(51) Int. Cl.[7] ............................................... G09B 25/00
(52) U.S. Cl. ...................................... 434/376; 152/158
(58) Field of Search ........................... 434/376; 152/158

(56) References Cited

U.S. PATENT DOCUMENTS 3,203,088 A * 8/1965 Voll ............................ 30/448
3,864,860 A 2/1975 Merzweiler ............... 40/125 M
4,348,891 A * 9/1982 Stickler et al. ............... 73/146
4,652,243 A 3/1987 Crosslen ..................... 434/376
5,174,760 A 12/1992 Gray .......................... 434/376
5,435,363 A 7/1995 Pender ....................... 152/158

* cited by examiner

Primary Examiner—Derris H. Banks
Assistant Examiner—Dmitry Suhol
(74) Attorney, Agent, or Firm—David E Wheeler

(57) ABSTRACT

The display device illustrates the ability to maintain a load without the support of compressed air. The display device comprises an expandable base (24) in contact with the floor, a support (32) connected to the expandable base wherein a distal end (30) of the support is substantially, vertically above the base, and a display (17) attached to the distal end of the support wherein the display comprises a plurality of tire sections (12, 14) and each tire section has compression means (16, 18) associated therewith for compressing the tire section.

7 Claims, 4 Drawing Sheets

RUNFLAT DISPLAY

TECHNICAL FIELD

The invention relates to a display device for runflat tires.

BACKGROUND ART

In commonly owned co-pending applications Ser. No. 08/391,746, filed Feb. 21, 1995; Ser. No. 08/865,490, filed May 29, 1997; Ser. No. 08/865,449, filed May 29, 1997; Ser. No. 08/865,489, filed May 29, 1997; and Ser. No. 08/865, 448, filed May 29, 1997, a runflat tire having sidewall inserts is described. The sidewall inserts in the tire provide support for the tire when air is removed. This support prevents the tire from collapsing, or going flat, when a catastrophic air loss occurs. To illustrate the ability of the tire to support the load when a catastrophic air loss occurs, a device is needed by which one can observe the difference between a conventional tire and the runflat tire.

DISCLOSURE OF INVENTION

An apparatus for dynamically illustrating tire properties comprises. a) an expandable base in contact with the floor and capable of holding at least one display tire, b) a support connected to the expandable base having a distal end substantially vertically above the base, and c) a display attached to the distal end of the support wherein the display comprises a plurality of tire sections and each tire section has compression means associated therewith for compressing the tire section. The expandable base is constructed in sections of structural material which is sized such that the structural material of one section overlaps and is slideable with respect to the structural material of another section.

In an illustrated embodiment, the display comprises a transparent case having a bottom attached to the support, sides extending upward from said bottom, a lid encompassing the sides, and the compression means comprise shafts extending through the lid and contacting the tire sections wherein the shafts are slideable with respect to the lid. The tire sections in the display comprise at least one conventional tire cross section and at least one tire section of a runflat tire.

Definitions

"Runflat" refers to a tire that maintains its shape and function when the air cushion contained in a pneumatic tire is lost.

DETAILED DESCRIPTION OF THE INVENTION

Figure 1:
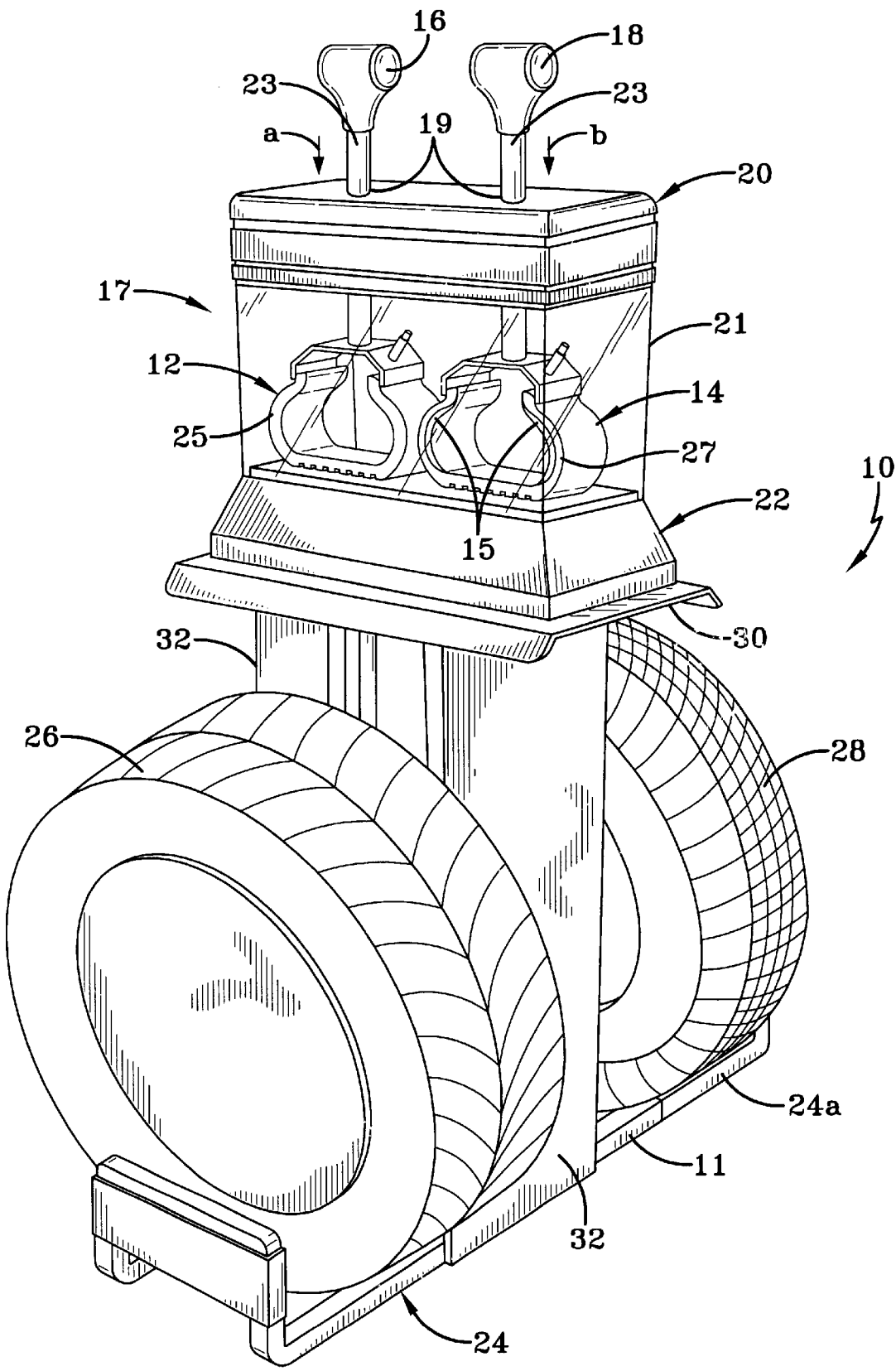
FIG. 1 illustrates the apparatus of the invention wherein the expandable base is expanded to support more than one tire.

With reference now to FIG. 1, apparatus 10 comprises an expandable base 24 for contact with the floor having support 32 attached thereto. At distal end 30 of support 32, display 17 is attached wherein tire sections 12 and 14 are shown side-by-side. The illustrated display comprises a bottom 22 having sides 21 extending upward therefrom, and lid 20 encompassing sides 21. In lid 20 are holes 19 which are used to guide shafts 23 through the lid 20 into contact with tire sections 12,14. A handle 16,18 is placed at one end of each shaft 23 to provide a means for manual compression of tire sections 12,14 when the display is used.

Those skilled in the art will recognize that display 17 may have other configurations., and in fact, the display may be made without sides or a lid, it being important only that means are provided which illustrate the ability of the tire sections in the display to support a load.

Figure 3:
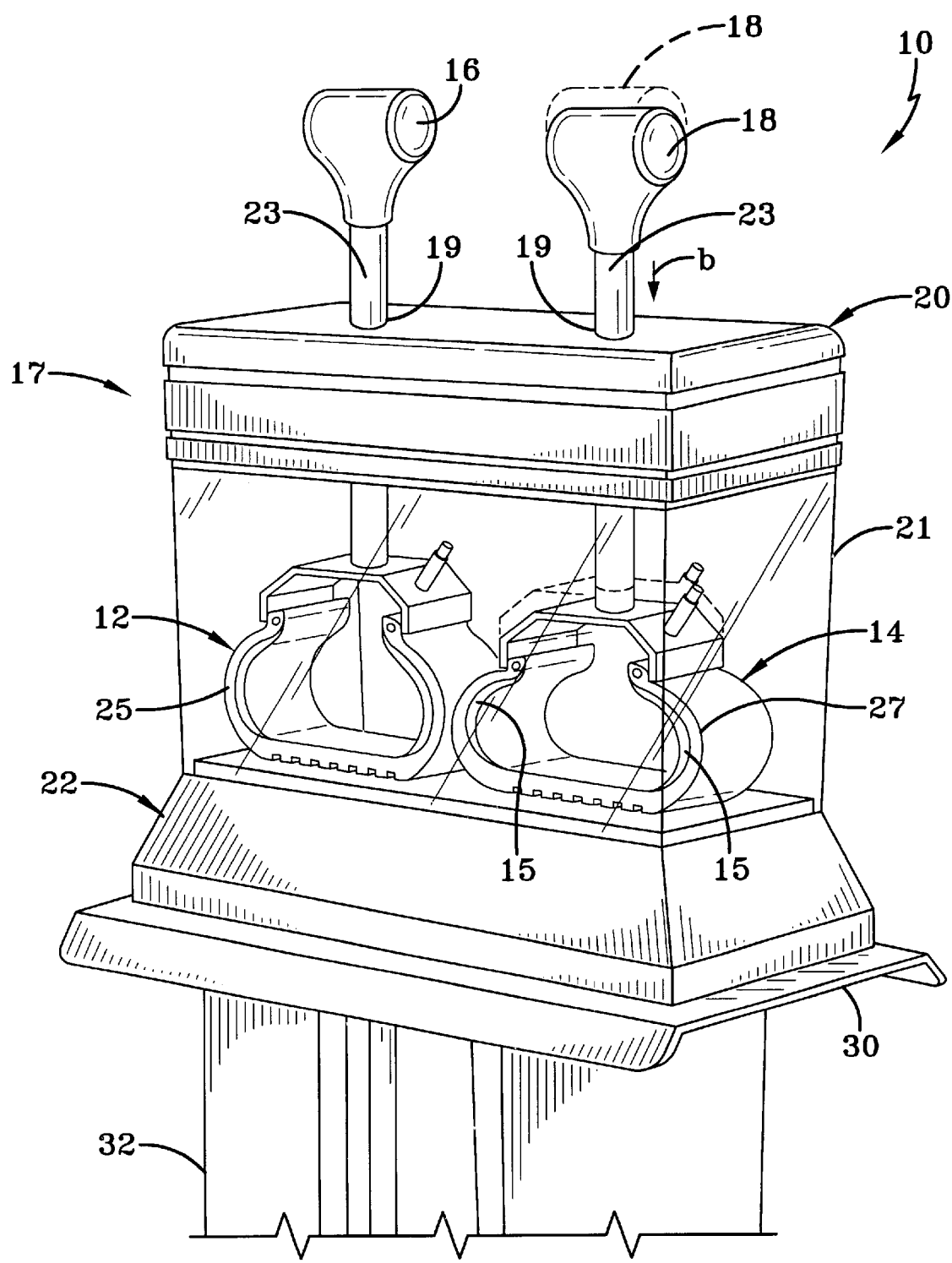
FIG. 3 illustrates the apparatus of the invention where a load is applied to a runflat tire.
Figure 4:
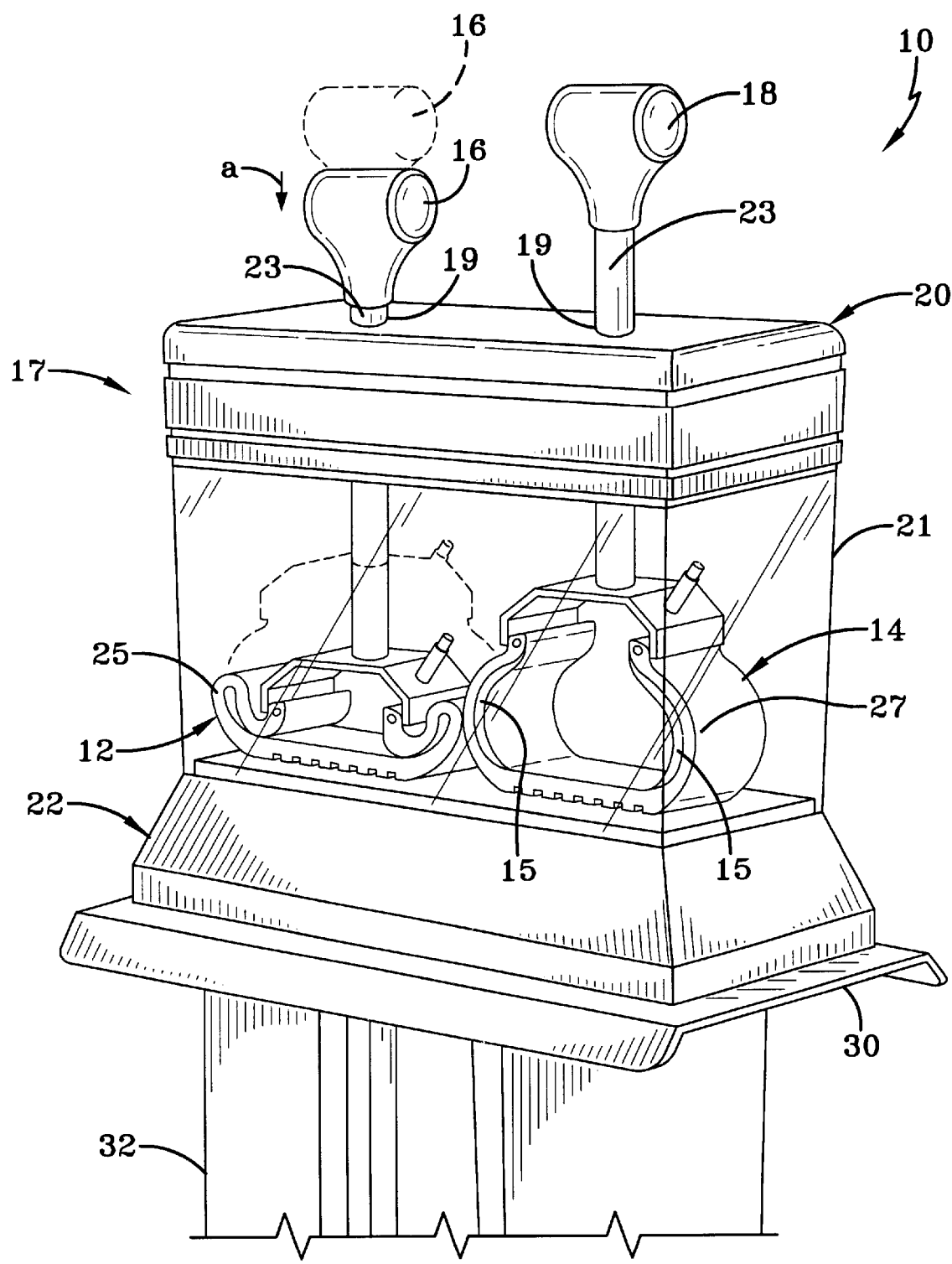
FIG. 4 illustrates the apparatus of the invention wherein a load is applied to a conventional tire.

Tire section 12 represents a portion of a conventional tire, and when handle 16 is pushed manually, sidewalls 25 of conventional tire 12 will collapse as illustrated in FIG. 4. By contrast, with reference to FIG. 3, when handle 18 is pushed. which is associated with runflat tire cross section 14, sidewalls 27 will not collapse, because of the load support provided by inserts 15 in runflat tire cross section 14.

Since the runflat tire is designed to support the weight of a car, the customer will not be able to collapse the cross section 14 of the tire manually, and this will illustrate graphically the purpose of the tire construction, as well as the structure of the tire construction.

Expandable base 24 may be made of any suitable material having sufficient strength which can be formed into suitable structure so that the base can be made expandable. In the illustrated embodiment, the base 24 is made expandable by building the base in two sections 24,24a wherein structural material 11 is sized so that structural material 11 in section 24a slides inside structural the material of section 24. In the illustrated embodiment, the structural material 11 used for constructing expandable base 24 is either angle iron or tubing. Those skilled in the art will recognize that the tubing may be round, rectangular, or square.

The expandable base, when expanded, can be used in the center of the floor, and a plurality of different sized. or different model tires may be placed on the expandable base.

In an illustrated embodiment, two different models 26,28 of a runflat tire are illustrated in the display.

Figure 2:
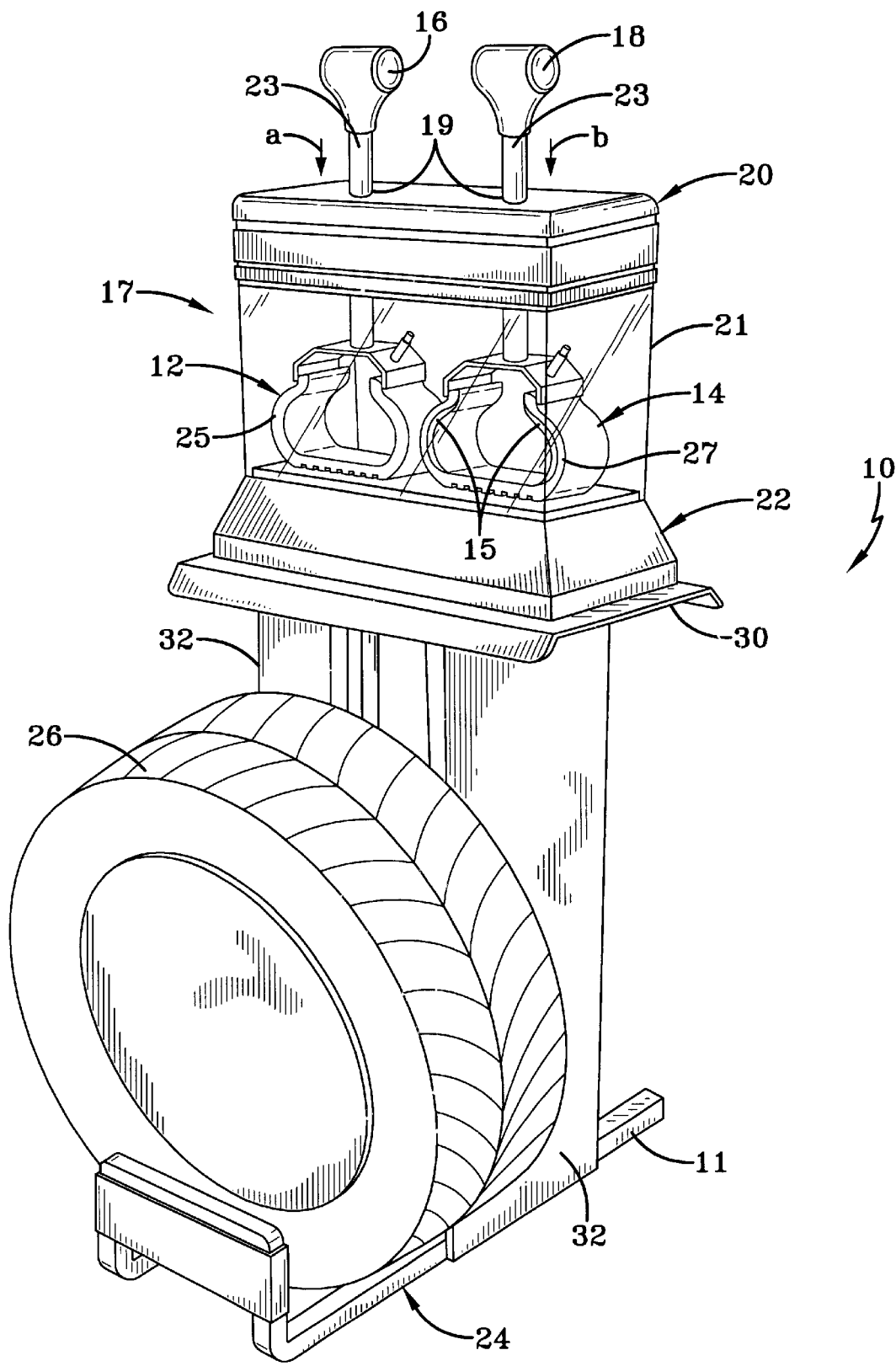
FIG. 2 illustrates the apparatus of the invention wherein the expandable base is collapsed such that it fits against the wall or other suitable location and supports one tire.

As an option, the expandable base can be collapsed as illustrated in FIG. 2, making the apparatus suitable to be placed against a wall or other suitable location, such as next to another display, and making available space to display at least one runflat tire.

With reference now to FIG. 3, when handle 18 is pushed manually in the direction of arrow b, the force exerted on tire section 14 tends to push the top of tire section 14 downward. Inserts 15, however, are designed such that, together with the natural strength of the sidewall. resist the collapse of sidewalls 27 up to a pressure of about 1400 pounds per square inch (1400 psi). Some flexibility is desired in the sidewall so that the tire is not too rigid and provides a good ride, and accordingly, sidewalls 27 will compress downward, under extreme load, about 10% of the tire section height before resistance that prevents collapse of the tire section is encountered.

By contrast, with reference now to FIG. 4, in conventional tire section 12, when manual load is applied to handle 16. in the direction of arrow a, sidewalls 25 of tire section 12 collapse completely.

Tire sections of production tires are used in the display as tire sections 12 and 14 to provide an actual comparison of load capacity for the tires.

While specific embodiments of the invention have been illustrated and described, those skilled in the art will recognize that the invention may be variously modified and practiced without departing from the spirit of the invention. The invention is limited only by the following claims.

What is claimed is:

1. An apparatus for dynamically illustrating tire properties comprising
   (a) an expandable base in contact with the floor and capable of holding at least one display tire;
   (b) a support connected to said expandable base, a distal end of said support being substantially vertically above said base; and
   (c) a display attached to said distal end of said support, wherein said display comprises a plurality of tire sections, each said tire section having compression means associated therewith for compressing said tire section.

2. The apparatus of claim 1 wherein said expandable base is constructed in sections and comprises structural material sized wherein structural material of one section overlaps and is slideable with respect to the structural material of another section.

3. The apparatus of claim 2 wherein said structural material is angle iron.

4. The apparatus of claim 2 wherein said structural material is tubing.

5. The apparatus of claim 1 wherein said display comprises a transparent case having a bottom attached to said support, sides extending upward from said bottom, and a lid encompassing said sides.

6. The apparatus of claim 5 wherein said compression means comprises shafts extending through said lid and contacting said tire sections, said shafts being slideable with respect to said lid.

7. The apparatus of claim 1 wherein at least one tire section comprises a section of a conventional tire, and at least one tire section comprises a section of a runflat tire.

* * * * *